United States Patent
Diamant et al.

(10) Patent No.: US 7,730,221 B2
(45) Date of Patent: Jun. 1, 2010

(54) LAN CONTROLLER WITH BOOTABLE HOST BUS ADAPTER

(75) Inventors: Nimrod Diamant, Kfar-Saba (IL); Dinesh Kumar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 333 days.

(21) Appl. No.: 11/174,410

(22) Filed: Jun. 30, 2005

(65) Prior Publication Data

US 2007/0005816 A1    Jan. 4, 2007

(51) Int. Cl.
*G06F 3/00* (2006.01)
(52) U.S. Cl. .............................. 710/1; 710/62; 710/72; 710/74
(58) Field of Classification Search ............... 710/1, 710/2; 709/220, 223, 230
See application file for complete search history.

(56) References Cited

U.S. PATENT DOCUMENTS

| | | | |
|---|---|---|---|
| 7,007,142 B2 * | 2/2006 | Smith | 711/162 |
| 7,036,040 B2 * | 4/2006 | Nicholson et al. | 714/6 |
| 7,111,202 B2 * | 9/2006 | Cagle et al. | 714/36 |
| 7,174,393 B2 * | 2/2007 | Boucher et al. | 709/250 |
| 7,191,241 B2 * | 3/2007 | Boucher et al. | 709/230 |
| 7,234,053 B1 * | 6/2007 | Mahmoud | 713/2 |
| 7,237,036 B2 * | 6/2007 | Boucher et al. | 709/245 |
| 7,284,070 B2 * | 10/2007 | Boucher et al. | 709/250 |
| 7,337,241 B2 * | 2/2008 | Boucher et al. | 709/250 |
| 7,664,903 B2 * | 2/2010 | Bělonožnik | 710/315 |
| 2002/0083221 A1 * | 6/2002 | Tsai et al. | 710/1 |
| 2004/0010612 A1 * | 1/2004 | Pandya | 709/230 |
| 2005/0060481 A1 * | 3/2005 | Belonoznik | 710/315 |
| 2005/0216715 A1 * | 9/2005 | Matheny et al. | 713/1 |
| 2005/0228903 A1 * | 10/2005 | Lerner et al. | 709/250 |
| 2006/0200641 A1 * | 9/2006 | Insley et al. | 711/163 |
| 2006/0218388 A1 * | 9/2006 | Zur et al. | 713/2 |
| 2006/0259291 A1 * | 11/2006 | Dunham et al. | 703/25 |

OTHER PUBLICATIONS

Burdruk et al. PCI Express System Architecture, Mindshare. 2003, Pages: overview, appendix d, communication systems, history of using PCI.*
PCI, PCI Local Bus Specification, 1998, PCI SIG, pp. 257-265.*

* cited by examiner

*Primary Examiner*—Henry W. H. Tsai
*Assistant Examiner*—Cheng-Yuan Tseng
(74) *Attorney, Agent, or Firm*—Christopher K. Gagne (57) ABSTRACT

A network controller with a bootable Host Bus Adapter, particularly suitable for iSCSI applications is described. In one example, this includes, a host bus interface, a register to the host bus indicating a mass storage device, a network interface, and a boot memory extension including a driver for the mass storage device that binds to a BIOS.

6 Claims, 8 Drawing Sheets

FIG. 8

LAN CONTROLLER WITH BOOTABLE HOST BUS ADAPTER

FIELD

The present description relates to accessing a remote mass storage device from a local terminal and, in particular, to providing access from a communications adapter that is available throughout a terminal boot process.

BACKGROUND iSCSI (Internet Small Computer System Interface) HBAs (Host Bus Adapters) (also known as initiators) are typically built as add-on adapter cards, such as PCI (Peripheral Component Interconnect) cards, that appear to the host as SCSI (Small Computer System Interface) cards. The SCSI cards get SCSI commands and encapsulate these commands as iSCSI payload over TCP/IP (Transmission Control Protocol/Internet Protocol). This encapsulated payload is sent over an Ethernet LAN (Local Area Network) connection to an iSCSI server (also known as an iSCSI target).

iSCSI HBAs typically integrate a TOE (TCP/IP Offload Engine) or a microprocessor that runs the iSCSI and TCP/IP protocol stack. Such iSCSI HBAs need a BIOS (Basic Input Output System) boot ROM (Read Only Memory) to allow the SCSI card to boot an OS (Operating System). iSCSI HBAs also need a host OS SCSI Miniport driver for the continuation of the OS boot when the BIOS hands off the control to the OS. This SCSI Miniport driver continues to serve the OS while it is running to access the SCSI or iSCSI exposed or connected disk. iSCSI HBA cards are expensive because they have a TOE and large memories for their operation including the boot ROM.

An alternative iSCSI system uses an iSCSI initiator driver that plugs underneath the OS storage stack as a SCSI driver and converts the OS SCSI commands to iSCSI payload. This payload is sent on top of the OS TCP/IP stack. With this software initiator driver that runs on the host CPU (Central Processing Unit), the OS can access iSCSI targets using a low cost LAN controller.

Running off the LAN controller requires that the LAN stack be running before the iSCSI initiator driver starts to run. The LAN stack loads from the OS boot disk where the OS is stored and this is done using the OS storage Miniport driver. Typically the storage driver is loaded to the host memory by the BIOS boot process which includes very basic essential components like the storage drivers that are marked as boot time drivers. The LAN stack is not loaded at this time so that the iSCSI initiator provided by the OS can not work at this early stage. This may prevent the system from booting up completely from the remote iSCSI target.

BRIEF DESCRIPTION OF THE DRAWINGS

The various advantages of the embodiments of the present invention will become apparent to one skilled in the art by reading the following specification and appended claims, and by referencing the following drawings.

DETAILED DESCRIPTION

According to one embodiment of the invention a host system, such as a PC may boot from an iSCSI drive by loading a special SCSI driver that looks to the OS like SCSI. The driver integrates iSCSI initiator software, a TCP/IP stack and a LAN driver. A standard LAN card may be used in this way even though it was not designed to operate this way.

Figure 1:
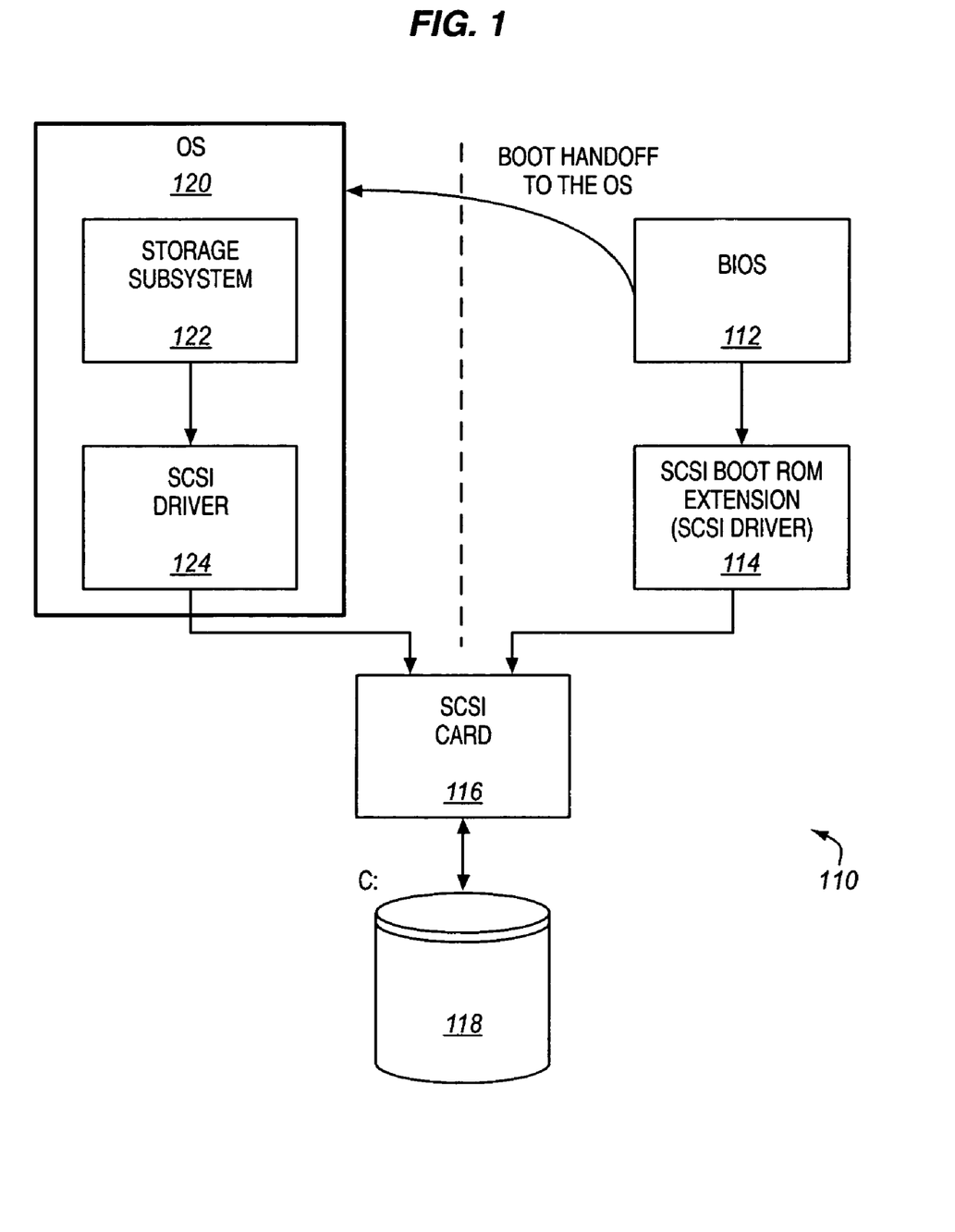
FIG. 1 is a conceptual block diagram of a conventional storage stack to boot from a local SCSI drive.

FIG. 1 shows an example of a conventional storage stack. The host system 110 includes a BIOS 112 that initiates a boot and connects to a SCSI boot ROM extension 114. The SCSI boot ROM extension allows the BIOS to boot up from a mass storage drive, such as a hard disk drive 118 (drive C:) through a SCSI card 116. When the BIOS has loaded all the hardware ports and drivers, it hands the boot process over to the OS 120 which has a storage subsystem 122 and its own OS SCSI driver 124. The OS SCSI driver allows the OS storage subsystem to access the mass storage 118 through the SCSI card 116 independently of the boot ROM extension. The OS SCSI driver allows the boot process to continue through the OS after the BIOS has handed off to the OS. The host system 110 of FIG. 1 and the systems of FIG. 2 through 6 include many other components which are not shown in order to not obscure the storage stack and other relevant components.

Figure 2:
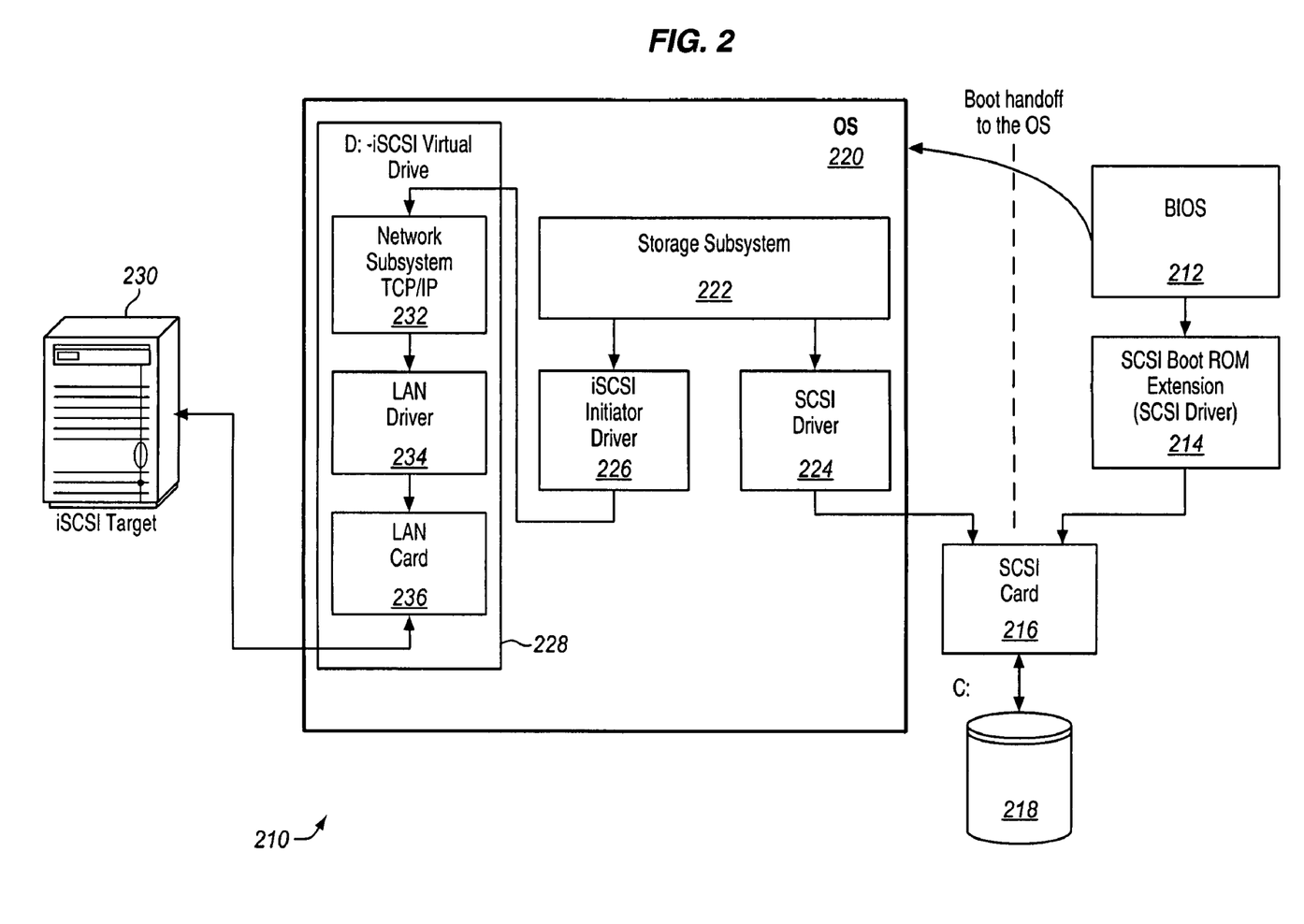
FIG. 2 is a conceptual block diagram of a conventional storage stack with a local SCSI drive and an iSCSI initiator to access a remote SCSI drive.

FIG. 2 shows an example of a conventional storage stack using an iSCSI initiator. This host system 210 also includes a BIOS 212 that initiates a boot and connects to a SCSI boot ROM extension 214 which allows it to access a mass storage device 216, such as a hard disk drive, through a SCSI card 216. When the BIOS hands off to the OS 220, the OS may continue as in FIG. 1 by connecting through its storage subsystem 222 to a SCSI driver 224 that allows access to the same SCSI card 216 and SCSI C: drive 218.

In addition to the components shown in FIG. 1, the FIG. 2 host system also includes an iSCSI initiator driver 226 below the OS storage stack, that allows the storage subsystem to connect through an iSCSI virtual drive (drive D:) to a remote iSCSI target drive 230. The iSCSI virtual drive includes a network subsystem 232 to convert SCSI commands from the OS to TCP/IP, a LAN driver 234 to communicate the TCP/IP over the LAN protocol, and a LAN card 236 to provide the physical layer to the LAN. The host system 210 offers connectivity to a remote drive 230, however, it can not boot from the remote iSCSI target because the remote target is only accessible through the OS 222 after the iSCSI virtual drive 228 is loaded.

Figure 3:
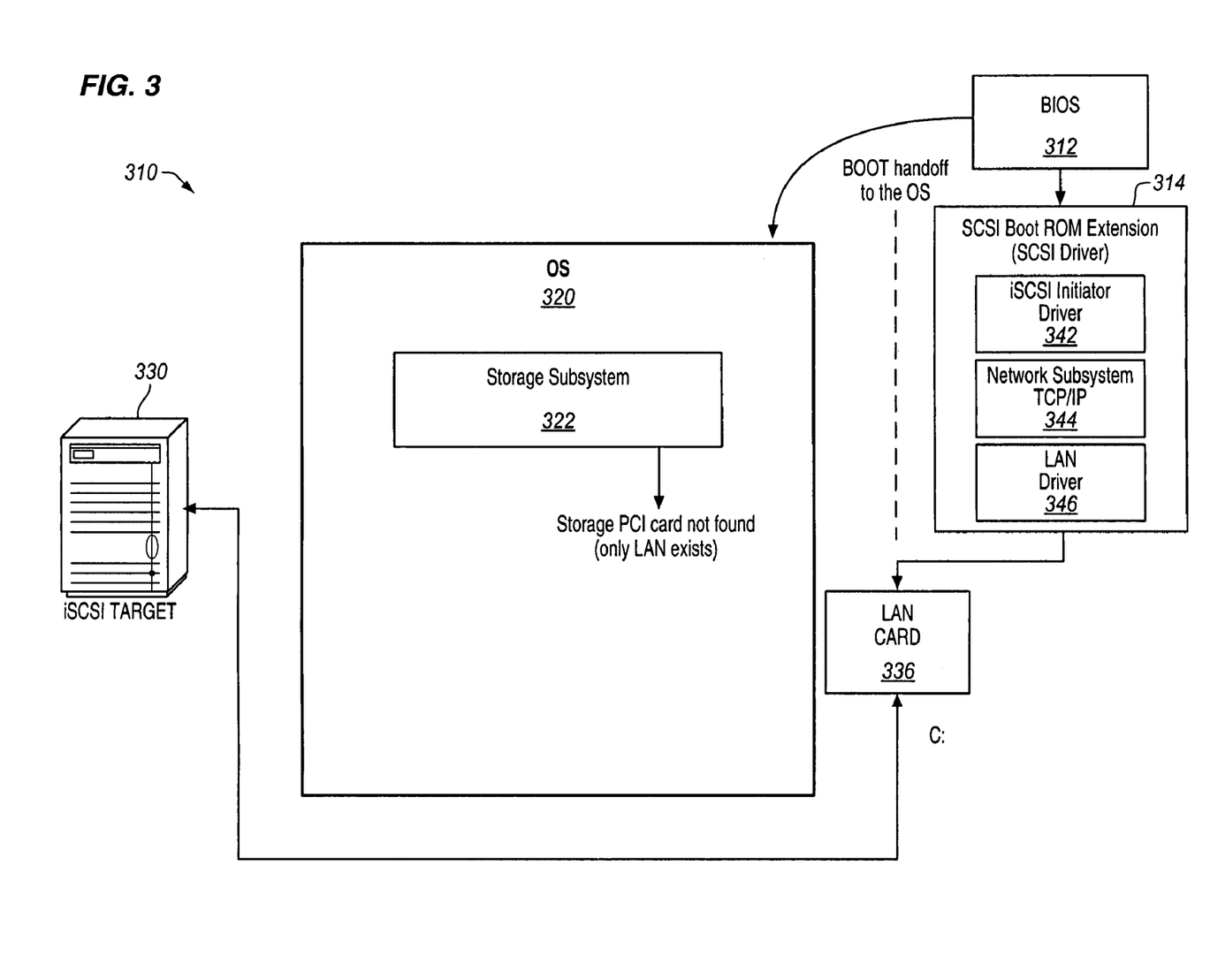
FIG. 3 is a conceptual block diagram of a conventional storage stack during an attempt to boot from a remote iSCSI drive.

FIG. 3 shows an example of a host system 310 that includes an iSCSI initiator accessible through a LAN. In the example of FIG. 3, the host system can boot starting with a BIOS 312. The BIOS can then go to booting off the iSCSI target 330 through a LAN card 336. In the example of FIG. 3, an Expansion ROM (SCSI Boot ROM extension) 314 may be used to reach the iSCSI target through the LAN card. The Expansion ROM integrates a disk driver (not shown) that binds to the BIOS as a storage device and provides INT13 (Interrupt 13, a storage system software interrupt) services to the BIOS. The iSCSI Expansion ROM also internally implements an iSCSI initiator 342, a TCP/IP stack 344, and a LAN driver 346 for the LAN card. These components are similar to the components of the iSCSI initiator driver 226 and iSCSI virtual drive 228 of FIG. 2 and provide access to the remote target drive in a similar way. However, in the example of FIG. 3, these components are directly connected to the BIOS and do not require OS support.

The architecture of FIG. 3 attempts to provide a solution for the diskless PC (Personal Computer) where the disk is actually located at the iSCSI target that is accessed using the above stack. The BIOS 312 accesses the OS boot sector from the iSCSI target using INT13 services that are serviced by the iSCSI Expansion ROM. The BIOS then hands off control to the OS 320. The OS boot sector will have just landed in the host memory.

The OS Loader continues to use INT13 routines (serviced by the iSCSI Expansion ROM) to load the boot time drivers including any storage drivers. After loading the storage drivers for any available storage device, the OS switches to protected mode and depends on the OS storage stack 322 to provide the access to its "boot disk". However, in the example of FIG. 3, in which there is no local SCSI storage device, the OS will not find any PCI (Peripheral Component Interconnect) storage device and therefore no storage miniport. As a result it can not continue to load itself from its "boot disk" which is only accessible using the LAN controller.

Figure 4:
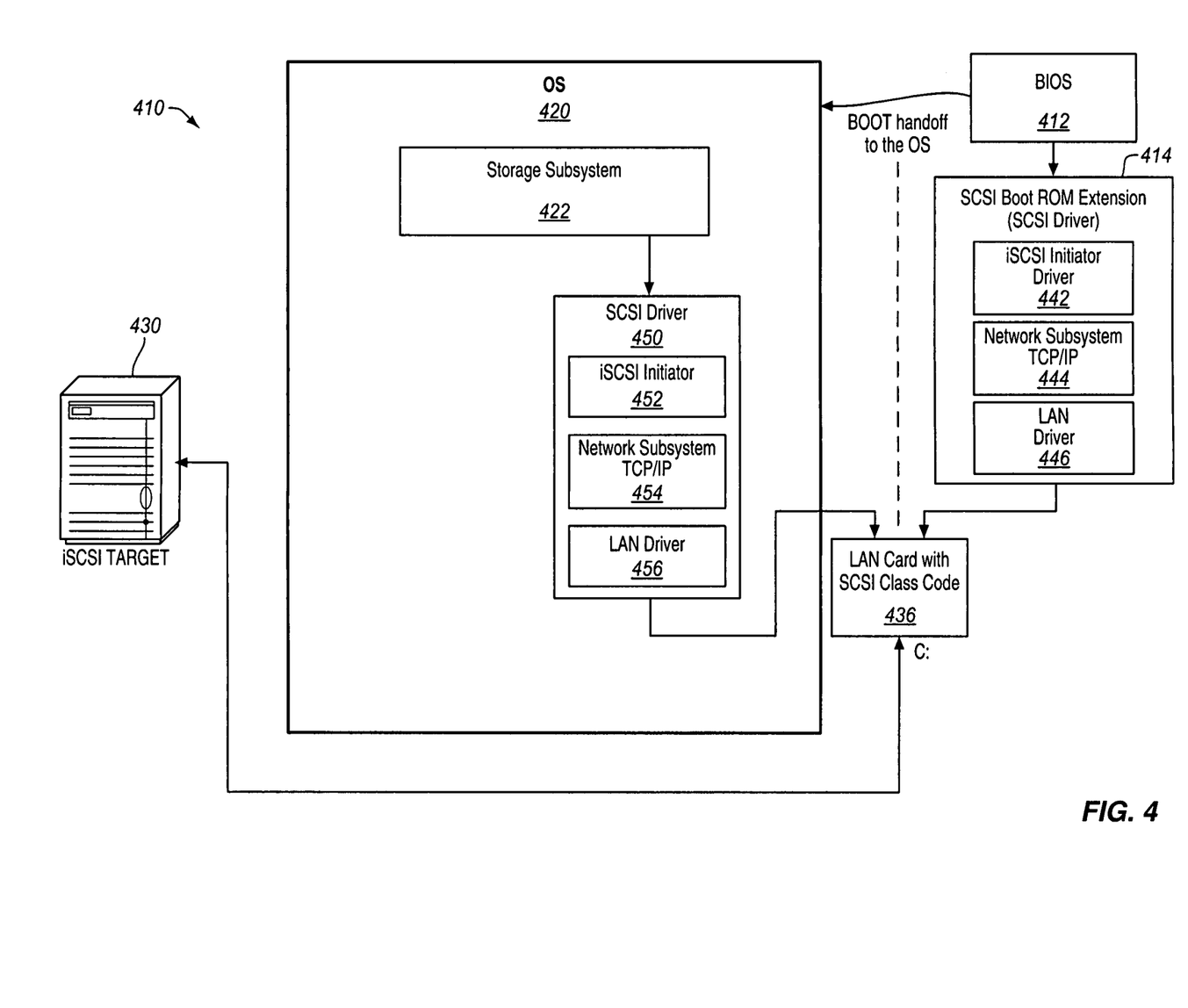
FIG. 4 is a conceptual block diagram of a storage stack that provides an iSCSI initiator over a LAN according to an embodiment of the invention.

FIG. 4 shows another architecture that may reliably start up using only a remote SCSI drive. The host system 410 has a BIOS 412 coupled to a SCSI driver 414 with a boot ROM extension. The SCSI driver includes an iSCSI initiator driver 442, a network subsystem 444, and a LAN driver 446 similar to the SCSI driver of FIG. 3. The SCSI driver is coupled to a LAN card 436 for access to the remote target SCSI drive.

The OS 420 has a storage subsystem 422, that in the example of FIG. 4 is coupled also to a SCSI driver 450. This SCSI driver also contains an iSCSI initiator 452, a network subsystem 459, and a LAN driver 456, all similar to the components of the SCSI driver that is coupled to the BIOS. To allow the host system to have a diskless boot or provide a diskless PC, class codes may be used.

Every PCI device has a PCI configuration space. One of the registers in the configuration space of every PCI device holds the device's class code. This is a value that categorizes the device, and reports to the OS and to the BIOS what type of device it is. Every LAN controller PCI device has a class code to indicate that it is a LAN controller. Every SCSI card PCI device has a SCSI card class code in this register. Typically the class code is hard coded into the device and is not configurable.

To allow the host OS to find its storage card and load its storage driver, the LAN card 436 may expose itself to the OS and to the BIOS as a SCSI device by having a SCSI value in its class code register. This value can be hard coded so that the LAN card always presents itself as a SCSI device. Alternatively, the SCSI class code may be configured upon system integrator demand. In such a case the class code can be configured from the LAN card's EEPROM (Electrically Erasable Programmable Read Only Memory) or from a strap pin or in any of a variety of other ways. Due to the SCSI class code, when the BIOS 412 hands off control to the OS 420, the OS finds a SCSI storage device 436 to which it loads its SCSI driver.

The SCSI driver 450 for the LAN card may look to the OS like a standard SCSI driver, similar to the SCSI driver 224 of FIG. 2. However to the network and the remote iSCSI device it may also include integration for the iSCSI initiator software 452, the TCP/IP protocol stack 454, and the LAN driver 456 that operate the LAN card as a regular LAN. As a result, the OS will no longer disconnect as suggested in FIG. 3, but will continue to use this LAN controller as an iSCSI initiator throughout the life time of the OS. The additional components, the iSCSI initiator, TCP/IP protocol stack and the LAN driver, may be contained in firmware or EEPROM of the LAN card or they may be a part of the device specific driver that will be loaded by the OS.

Figure 5:
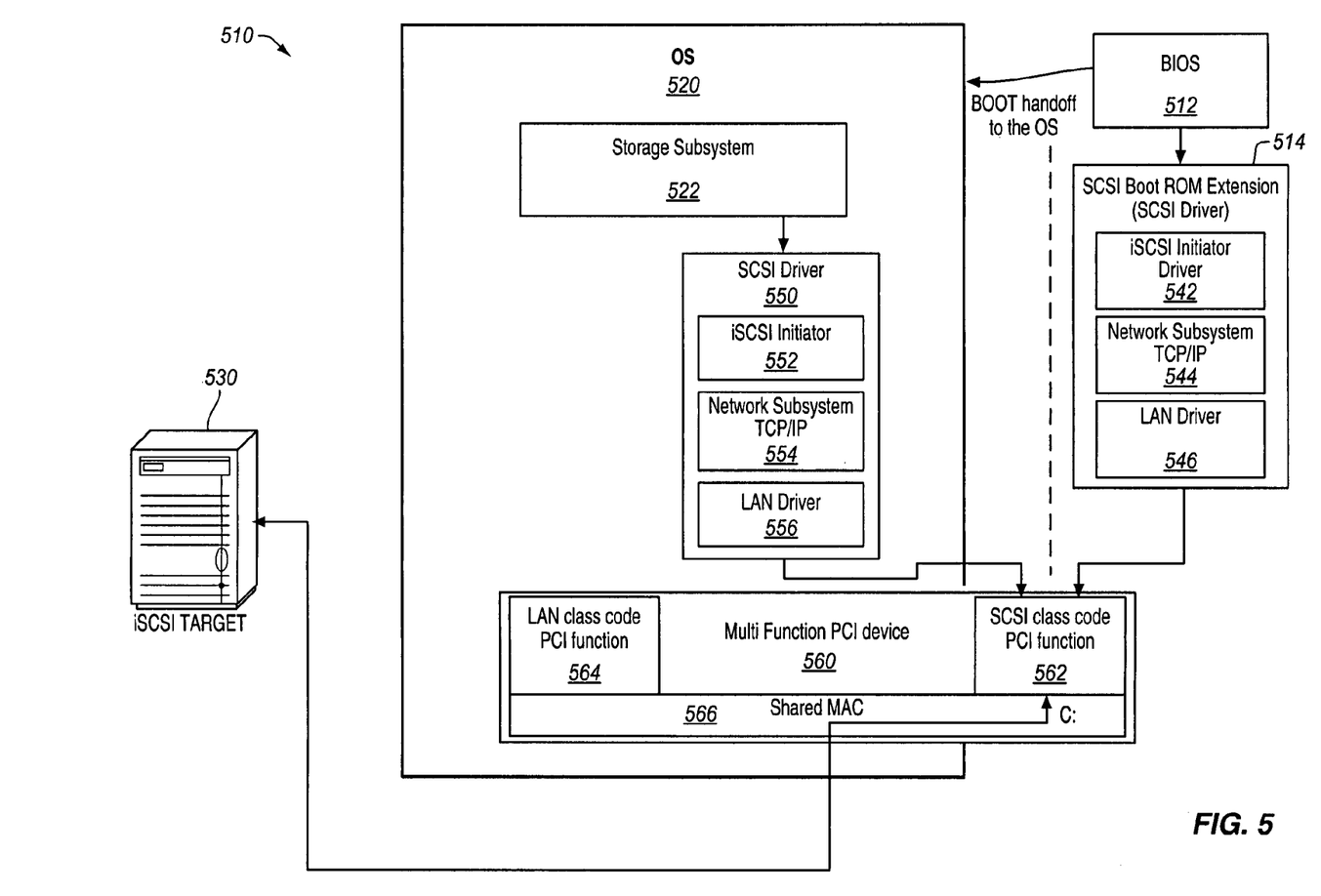
FIG. 5 is a conceptual block diagram of a storage stack that provides an iSCSI initiator over a LAN together with a LAN adapter according to an embodiment of the invention.

FIG. 5 shows an alternative host system 510 that allows the LAN card that is coupled to the target remote iSCSI drive to also be used for other LAN traffic and functionality. When a LAN controller port is modified to appear to be a SCSI controller in the PCI Configuration Space, the LAN controller port no longer is identified as a LAN controller. This may prevent it from carrying other LAN traffic. Another port may then be required to obtain LAN functionality. For some applications it may be desired to separate the iSCSI drive from the network or to provide a separate LAN controller. However, the alternative of FIG. 5 allows both iSCSI and LAN functionality to be served with a single LAN port. In other words, a LAN port is not sacrificed in order to provide for iSCSI. Both iSCSI as well as LAN functionality are provided from a single port using a single cable.

In FIG. 5, the host system includes a BIOS 512 that accesses a SCSI boot ROM extension 514, that includes a SCSI initiator driver 542, a network subsystem 54 and a LAN driver 546, similar to the components as shown in FIG. 4. The boot process for the BIOS is similar to that of FIG. 4. The OS 520 includes a storage subsystem 522 and below that a SCSI driver similar to that of FIG. 4 with an iSCSI initiator 552, a network subsystem 554 and a LAN card 556. As in FIG. 4, a remote SCSI target is coupled to the host system through a LAN.

In the embodiment of FIG. 5, a multi-function PCI device 560 is coupled to the host system PCI bus and is also coupled to the LAN port. The multi-function PCI device includes two PCI entities coupled to the same MAC (Media Access Control) address 566. The first entity 562 has a SCSI class code and a complete set of SCSI registers and the second entity 564 has a LAN class code and a complete set of LAN adapter registers.

The SCSI class code PCI function 562 performs as additional input to the internal LAN functionality and actually shares the LAN connection and port 566 with the LAN class code PCI function 564. The SCSI function has its own set of registers and queues so that its driver may use it as if the LAN controller was its own.

When the OS boots from the remote SCSI target, it will operate similar to the version of FIG. 4 and detect the remote SCSI target as a local drive. Later on, OS Boot will detect the additional LAN PCI functions for the LAN device and will install a LAN driver for that function. This LAN function and its driver can use their LAN and its queues as if it was owned by it. The shared MAC may support multiple queues, in this example, a LAN queue and an iSCSI queue.

This architecture allows real sharing of iSCSI traffic and LAN traffic without the need to sacrifice a LAN function for the iSCSI boot functionality. Additional class codes and registers may be added in the same way to provide additional PCI functionality over the same LAN port with the same multifunction PCI device 560.

Figure 6:
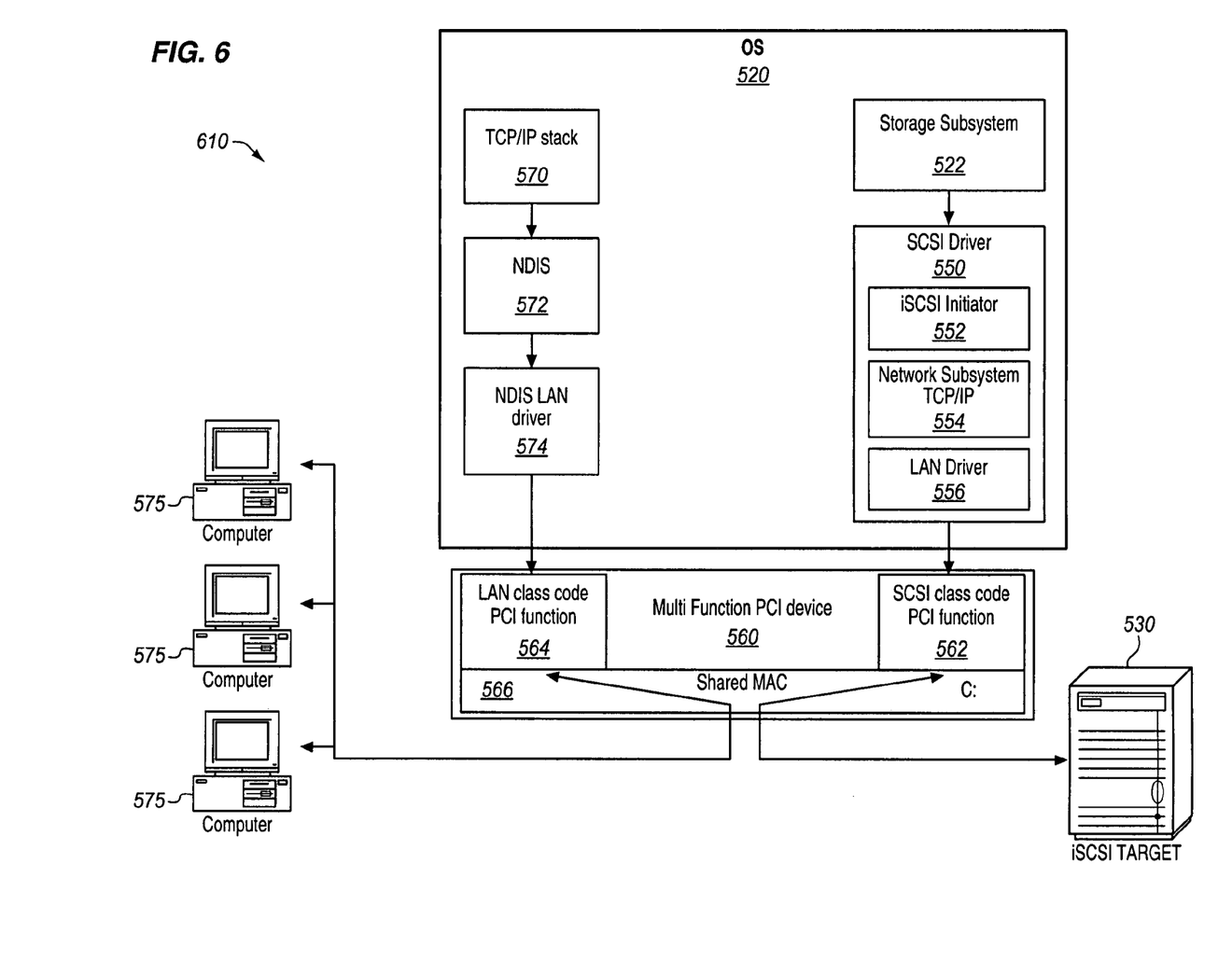
FIG. 6 is a conceptual block diagram of the storage stack of FIG. 5 together with a fully booted LAN stack to provide an iSCSI initiator over a LAN together with a LAN adapter according to an embodiment of the invention.

FIG. 6 shows the host system 610 with the same configuration as FIG. 5 after the iSCSI boot handed off control to the OS, after the SCSI driver stack 550, 552, 554, 556 has been loaded and after a LAN stack has been loaded. The LAN stack includes a TCP/IP stack 570, an NDIS (Network Driver Interface Specification) 572, and a NDIS LAN driver 574 coupled to the LAN card portion 564 of the multifunction PCI device 560. The two stacks may now be running together providing access to the remote SCSI target 530 as well as to networked LAN devices, such as PCs 575 across the same LAN port.

Figure 7:
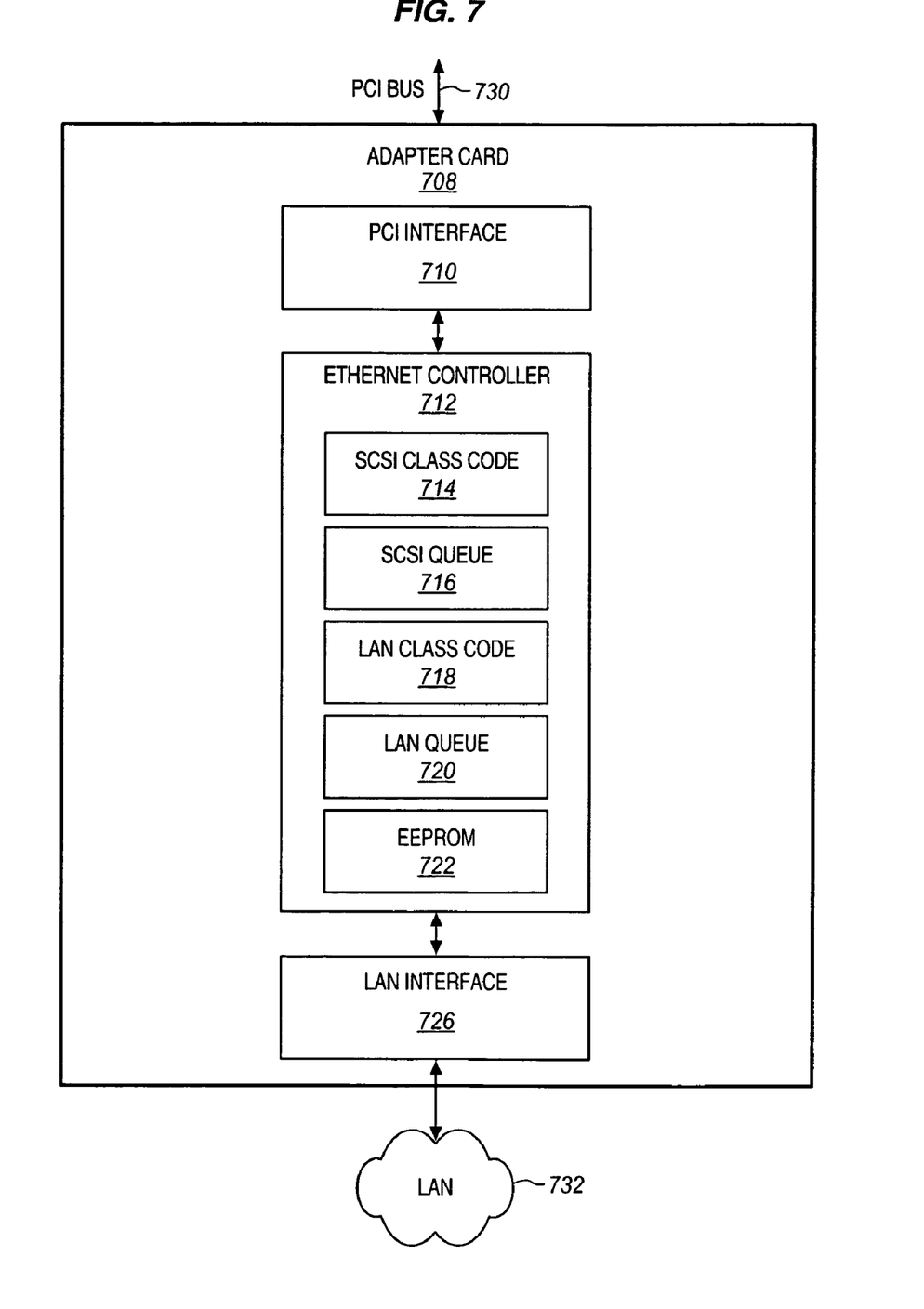
FIG. 7 shows an example of a LAN adapter card that may be used to implement embodiments of the present invention.

FIG. 7 shows an example of a LAN adapter card 708 that may be used to implement embodiments of the present invention. In FIG. 7, the adapter has a PCI interface 710 coupled to a PCI bus 730. The PCI interface is coupled to an Ethernet controller 712. The PCI interface may be as simple as a set of connector pins and leads that couple to the controller or it may include various buffers and timing devices to accelerate communication across the host PCI bus 730. Depending on the implementation, the bus interface may be adapted for a different host bus, including USB (Universal Serial Bus), Firewire, or any of a variety of other buses including wireless interfaces. The controller is also coupled to a LAN interface 726 that may be coupled to a network cable 732. Like the PCI interface, the LAN interface may be a simple cable connector or it may also include circuits and buffers to aid in communications over the LAN. While Ethernet is described herein, any other type of wired or wireless local or wide area network may be used.

The controller includes class code registers that are made available to the BIOS and OS upon request. There is a register for a SCSI class code 714 that may be discovered early in the boot. There are also registers for SCSI queues 716. In addition, if the LAN card is to provide other functionality, then there may be class code registers for other devices such as a LAN class code 718 with corresponding registers for the LAN queue 720. The controller further contains various memory and logic circuits including an EEPROM 722 to carry class codes and boot ROM extensions among others. The controller may contain more or fewer components than those depicted and additional functions and components may be included in the LAN card, depending on the implementation. While the LAN adapter card is shown and described as a separate component, it may be implemented as a single chip on a system board or integrated into another chip, such as a I/O Control Hub or a microprocessor.

Figure 8:
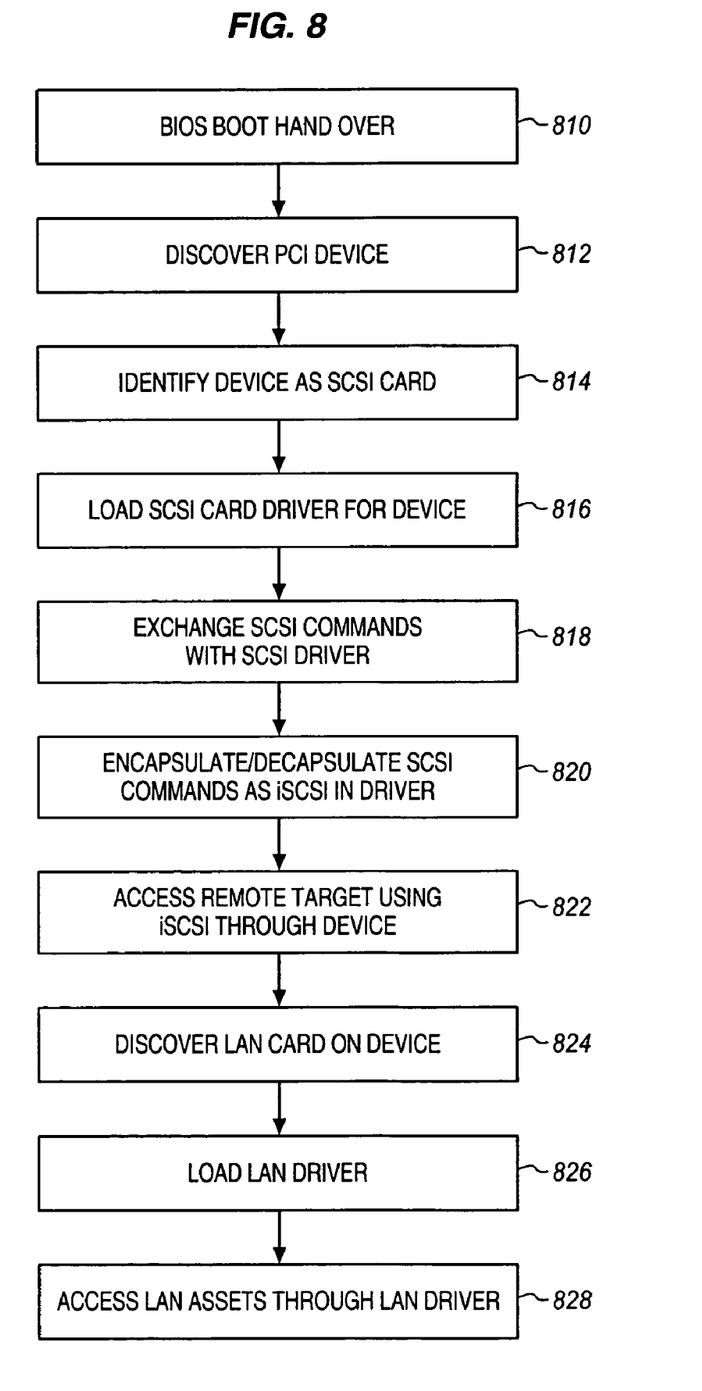
FIG. 8 is process flow diagram of booting a system through an adapter card that is continuously available according to an embodiment of the invention.

FIG. 8 shows a simplified example of a start up process that may be used in an embodiment of the invention. At block 810, the BIOS hands the boot over to the OS. The BIOS may go through several different steps before handing over that are not shown. At block 812, the OS discovers the PCI device. This may be in the context of the discovery of many other devices or in a simple search for mass storage devices. At block 814, the OS identifies the device as a SCSI card. This may be done for a PCI device by reading the class code registers.

The OS will then search for an appropriate driver for the SCSI drive and at block 816 it loads the appropriate SCSI card driver for the device. With the driver loaded at block 818, the OS exchanges SCSI commands with the SCSI driver. The SCSI driver, as described above, includes an iSCSI initiator, a network subsystem, and a LAN driver. Accordingly, the driver encapsulates and decapsulates SCSI commands as iSCSI at block 820. The LAN card sees these as LAN packets and, at block 822, accesses a connected remote target using iSCSI through the device.

If the LAN card offers additional functionality, then as the boot continues it may present additional functions to the OS. At block 824, the OS discovers a LAN card on the device. At block 826, the OS loads a LAN driver for the device. With the LAN driver loaded, the OS may now access LAN assets through the LAN driver at block 828. Additional functions may be accessed through additional drivers in a similar way.

The embodiments of the present invention described above allow a low cost LAN adapter card to be used to provide a boot from a remote mass storage device. The described embodiments avoid the expense of TOE and they avoid the difficulties in having the BIOS hand off to the OS.

While embodiments of the invention are described in the context of an iSCSI LAN card adapter coupled to a PCI bus, these examples are provided only to illustrate features of some embodiments of the invention. Other types of mass storage device communications protocols may be used. Other types of remote device communication protocols may be used. Other types of computer data buses may be used, and other types of hardware configurations may be used. Rather than an adapter card, the remote drive communication may be performed by a special chip integrated onto a system board or the functionality may be added to another chip such as a memory control hub, an input/output control hub, a bus controller, or a CPU. Embodiments of the present invention may be extended to types of mass storage devices other than hard disk drives, such as optical drives, flash memory drives and other storage devices.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disc storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus, the following claims are hereby incorporated into the detailed description, with each claim standing on its own as a separate preferred embodiment.

What is claimed is:

1. A method comprising:
   discovering by an operating system an apparent mass storage device, the operating system being resident in a host, the discovering being based on a SCSI class code register value stored in an adapter in the host, the apparent mass storage device appearing to be a local mass storage device at the host, the adapter also storing a local area network (LAN) class code, the adapter comprising both a first queue and a second queue, the first queue being for first network traffic associated with the SCSI class code register value, the second queue being for second network traffic associated with the LAN class code, the first network traffic and the second network traffic being contemporaneously processed by separate respective stacks, the separate respective stacks being comprised in the operating system, the SCSI class code register value being reconfigurable;

loading by the operating system a device driver, the device driver being for the discovered apparent mass storage device, the loading being based upon the SCSI class code register value, the loading of the device driver enabling the operating system to continue booting of the operating system from a target, the target being remote from the host, the booting of the operating system having been initiated by a Basic Input Output System (BIOS), the booting using another driver associated with the target, the another driver binding to the BIOS, the another device driver being a boot memory extension;

sending mass storage device commands to the device driver loaded by the operating system;

converting the mass storage device commands within the driver loaded by the operating system to payloads encapsulated within network packets;

providing the network packets to the target.

2. An apparatus comprising:

an adapter card comprising:

a host bus interface;

a controller to store contemporaneously both a Small Computer System Interface (SCSI) class code and a local area network (LAN) class code, the SCSI class code indicating to an operating system an apparent mass storage device, the operating system residing in a host system, the apparent mass storage device appearing to be a local mass storage device located at the host system, the controller also comprising both a first queue and a second queue, the first queue being for first network traffic associated with the SCSI class code, the second queue being for second network traffic associated with the LAN class code, the first network traffic and the second network traffic being contemporaneously processed by separate respective stacks, the separate respective stacks being comprised in the operating system, the SCSI class code being reconfigurable;

a network interface coupled to a target that is remote from the host system; and a boot memory extension including a driver for the target that binds to a Basic Input Output System (BIOS) to enable the BIOS to begin booting the operating system from the target;

wherein the controller exposes the SCSI class code to the operating system, the exposed SCSI class code enabling the operating system to load another driver, the another driver being associated with the apparent mass storage device that is indicated by the SCSI class code, the another driver being to enable the operating system to continue to boot from the target.

3. An apparatus comprising:

a host system comprising a central processor and a peripheral device bus; and a peripheral network adapter device comprising a host bus interface coupled to the peripheral device bus, the adapter device contemporaneously storing both a Small Computer System Interface (SCSI) class code and a local area network (LAN) class code, the SCSI class code indicating that the peripheral network adapter device is an apparent mass storage device, the apparent mass storage device appearing to be a local mass storage device at the host system, the adapter device also storing a boot memory extension, the boot memory extension including a driver for the mass storage device, the driver binding to a Basic Input Output System (BIOS) so as to enable the BIOS to begin booting an operating system from a target, the target being remote from the host system, the driver also binding to the BIOS so as to expose to the operating system the SCSI class code to thereby enable the operating system to load another driver, the another driver being associated with the apparent mass storage device that is indicated by the SCSI class code, the another driver enabling the operating system to continue to boot from the target, the adapter device also comprising both a first queue and a second queue, the first queue being for first network traffic associated with the SCSI class code, the second queue being for second network traffic associated with the LAN class code, the first network traffic and the second network traffic being contemporaneously processed by separate respective stacks, the separate respective stacks being comprised in the operating system, the SCSI class code being reconfigurable.

4. The method of claim 1, wherein the method further comprising converting commands to a mass storage drive to network messages and applying the network messages to the network interface.

5. The method of claim 4, further comprising sending the network messages to a remote mass storage device.

6. The apparatus of claim 2, wherein the SCSI class code indicates to the operating system that the apparent mass storage device is a local SCSI device.

* * * * *